United States Patent [19]

Kotegawa

[11] Patent Number: 5,352,464
[45] Date of Patent: Oct. 4, 1994

[54] PROCESS FOR THE MANUFACTURE OF SALT-FREE, CONDENSED SEASONING POWDER

[75] Inventor: Michiro Kotegawa, Usuki, Japan

[73] Assignee: Fundokin Shoyu Kabushiki Kaisha, Oita, Japan

[21] Appl. No.: 661,174

[22] Filed: Feb. 27, 1991

[30] Foreign Application Priority Data

Apr. 17, 1990 [JP] Japan ................................. 2-99235

[51] Int. Cl.$^5$ .......................................... A23L 1/221
[52] U.S. Cl. .......................................... 426/18; 426/7; 426/46; 426/44; 426/49; 426/589; 426/650
[58] Field of Search .................. 426/46, 18, 7, 44, 49, 426/589, 650

[56] References Cited

U.S. PATENT DOCUMENTS 4,505,938  3/1985  Togawa et al. ...................... 426/46

FOREIGN PATENT DOCUMENTS

| 0047801 | 3/1982 | European Pat. Off. | 426/46 |
| 37-3540 | 6/1962 | Japan | 426/46 |
| 52-90699 | 7/1977 | Japan | 426/46 |
| 53-23400 | 7/1978 | Japan | 426/46 |
| 57-50858 | 3/1982 | Japan | 426/46 |

*Primary Examiner*—Joseph Golian
*Attorney, Agent, or Firm*—Birch, Stewart, Kolasch and Birch

[57] ABSTRACT

A process for the manufacture of salt-free, condensed seasoning powder, comprising the steps of:
adding koji mold to proteinaceous and/or starch-rich starting materials to produce koji;
subjecting the koji to hydrolysis, without adding salt, in the presence of alcohol;
removing insolubles from the hydrolysate; and
concentrating and drying the remaining mother liquor to yield seasoning powder.

17 Claims, No Drawings

PROCESS FOR THE MANUFACTURE OF SALT-FREE, CONDENSED SEASONING POWDER

BACKGROUND OF THE INVENTION

1. Field of the Invention

The present invention relates to a process for the manufacture of salt-free, condensed seasoning powder. More specifically, it relates to a process for the manufacture of said seasoning powder, which comprises adding koji mold to denatured proteinaceous and/or starch-rich starting materials to produce koji; hydrolyzing the resultant koji for a short period of time in the presence of alcohol as a preservative, without the addition of salt; removing insolubles; and then concentrating and drying the remaining mother liquor to give seasoning powder.

2. Description of Related Art

As has been well known to those skilled in the art, there have been many problems associated with the manufacturing of condensed seasoning powder without using salt. Examples of such problems are the need to keep the materials and operating equipment sterile, performing the hydrolysis at elevated temperatures, treatment with acid or alkali, and demineralization. These and related problems have lead to a considerable increase in the cost of equipment and to complicated processing steps. These drawbacks make the process highly unsatisfactory, and must therefore be avoided.

If the hydrolysis is carried out at elevated temperatures, commercially disadvantageous darkening and carmelized, "thermal smelling" of the final products occur, reducing the commercial value of the products considerably.

Hydrolysis in the presence of koji enzyme is normally carried out at 40°–60° C. for 15–30 hours. At a temperature of about 55° C., however, it is frequently found that even though hydrolysis is complete within 20–24 hours, the above-mentioned disadvantages (darkening and thermal smelling) cannot be avoided, reducing the commercial value of the products, as noted above.

SUMMARY OF THE INVENTION

It is therefore an object of the present invention to provide an improved process for the manufacture of a thick, light-colored, salt-free, condensed seasoning powder possessing an appetite-stimulating sweet taste and pleasant smell.

DETAILED DESCRIPTION OF THE INVENTION

The present invention provides a process for the manufacture of salt-free condensed seasoning powder, which comprises adding koji mold to conventionally denatured proteinaceous and starch-rich starting materials to produce koji, subjecting the koji to hydrolysis without adding salt in the presence of alcohol, removing insolubles from the hydrolysate, and concentrating and drying the remaining mother liquor to produce seasoning powder.

In the present process, koji mold is added to proteinaceous and starch-rich starting materials which have been previously treated and denatured in conventional manner, thus yielding koji, which is then hydrolyzed by adding water and alcohol.

Proteinaceous materials used in the present invention may be of any origin such as from animals, vegetables or microorganisms. Suitable examples include soy bean, soy protein products, wheat gluten, corn gluten, refined soy protein, and the like. Suitable starch-rich materials which may be employed include, for example, rice, wheat, barley, wheat bran, corn, and the like.

These starting materials are subjected to a pretreatment such as conventional pressure and heat puffing, heat treatment, and the like, and combinations thereof.

The thus denatured proteinaceous and starch-rich materials are then mixed together, followed by the addition of koji mold, to produce koji. Preferably, microorganisms belonging to the genus Aspergillus, such as *Aspergillus sojae* and *Aspergillus oryzae*, are employed as koji mold.

preferably, the amount of water used for the hydrolysis is in the range of about 1–2 times the weight of koji.

The amount of alcohol used for the hydrolysis may range from 3 to 50% by volume, whereby the disadvantageous growth of harmful microorganisms and spoiling of the starting materials are prevented even if held at a relatively low temperature of about 30° to about 40°. Indeed, an hydrolysate of good quality can be obtained in as short a period of time as about 1 to about 5 days without causing inactivation of koji.

The hydrolysate contains 93% or more of the total nitrogen content, and 92% or more of the total sugar content, of the starting materials employed.

The term "alcohol" as used in the present invention refers to ethanol and acceptable substitutes therefore.

By varying the ratio of the starting proteinaceous material to the starch-rich material, and also by varying the types thereof in the process of the present invention, products with different taste qualities may be obtained. For example, an increase in the amount of proteinaceous material results in an increase in amino acid content of the resultant product, while an increase in the amount of starch-rich material leads to sugar-rich and sweet products.

According to the present invention, thicker and more condensed seasoning mother liquor containing not less than 33% salt-free soluble components, in comparison with that of 20% of the prior art, can be obtained. The subsequent steps of concentrating and drying therefore become easier, which is a further advantage of the present invention. The thick, salt-free hydrolysate thus obtained is then concentrated and dried by conventional methods such as hot-air drying, freeze-drying, etc. If the foregoing concentration is carried out by distillation under reduced pressure, 90% or more of the alcohol in the hydrolysate can be recovered, thus rendering the process very economical. Conventional fillers may also be added during the drying process for easier operation.

The invention is further illustrated by the following non-limiting Examples, wherein all parts and percentages are by weight unless otherwise stated.

EXAMPLE 1

100 kg of soy protein products were sprinkled with 140 l of water, and then pretreated with heat and pressure. Then, 100 kg of roasted and ground wheat grain were added thereto and mixed thoroughly. The mixture thus obtained was inoculated with *Aspergillus sojae*, and held at about 30° C. for two days to yield soy koji.

The resultant koji was mixed well with 270 l of water and 20 l of 99.5% ethanol, and the mixture was then subjected to hydrolysis at 38° C. for 72 hours with occasional agitation.

After termination of hydrolysis, the hydrolysate was compressed to give the mother liquor, and insolubles were removed. The mother liquor was analyzed according to Standard Test for Soy Sauce" (issued from The Japan Soy Sauce Research Institute, Tokyo, Japan, 1985). The results are shown in Table 1.

TABLE 1

| TN | FN | Glu | RS | P-EX | Alc | FN/TN | Glu/TN | pH | TC |
|---|---|---|---|---|---|---|---|---|---|
| 2.11% | 1.37% | 1.73% | 16.5% | 33.8 | 3.01% | 0.65 | 0.82 | 5.56 | 37 |

Note
TN: Total Nitrogen Content
FN: Formal Nitrogen
Glu: Glutamic Acid
RS: Reducing Sugar (Calculated as Glucose)
P-EX: Salt-free Soluble Components
Alc: Ethanol
TC: Total Chromaticity (Color of Soy Sauce)

Next, the mother liquor was concentrated to half the original volume under reduced pressure, whereby 19 l of a distillate containing 75% ethanol were recovered. Thereafter, the concentrate was dried and pulverized by conventional methods to produce 135 kg of a thick, salt-free, pale-colored seasoning powder having an appetizing, sweet taste.

EXAMPLE 2

The procedure of Example 1 was followed, using 200 l of water to yield 330 l of mother liquor.

The liquor was then concentrated, resulting in recovery of 23 l of distillate containing 78% ethanol; 120 kg of the product was finally obtained.

The product was analyzed as in Example 1, and the results are shown in Table 2.

TABLE 2

| TN | FN | Glu | RS | P-EX | Alc | FN/TN | Glu/TN | pH | TC |
|---|---|---|---|---|---|---|---|---|---|
| 2.80% | 1.62 | 2.30% | 21.0% | 42.5 | 3.95 | 0.58 | 0.82 | 5.50 | 37 |

COMPARATIVE EXAMPLE

The procedure of Example 1 was followed, except that the hydrolysis was conducted at 55° C. for 24 hours in the absence of ethanol. The test results of the mother liquor thus obtained are shown in Table 3.

TABLE 3

| TN | FN | Glu | RS | P-EX | FN/TN | Glu/TN | pH | TC |
|---|---|---|---|---|---|---|---|---|
| 2.19% | 1.31% | 1.56% | 17% | 32.4 | 0.60 | 0.71 | 5.60 | 25 |

Comparison of the total chromaticity of 25 obtained in the Comparative Example with that of 37 obtained in each of Examples 1 and 2 demonstrates that the product of the Comparative Example is 2.5 times darker than that of Examples 1 and 2.

In addition, the content of Glu, which is regarded as an indicator of tastiness of the product, is 1.73% in the product of Example 1. This is about 10% higher than the Glu content of 1.56% in the product of the Comparative Example. From an organoleptic standpoint, the product of the Comparative Example suffers from a carmelized, thermal odor and a "digested" odor, i.e., the odor produced when koji is acted on by its own enzymes, as a result of conducting the production process at elevated temperatures. It is therefore of inferior quality and lower commercial value.

In comparison, since the hydrolysis step of the present process is conducted at the relatively low temperature of 30°–40° C. in the presence of alcohol, no thermal deterioration is observed. The resulting product is thick, light-colored, pleasant smelling, and deliciously sweet tasting. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the manufacture of salt-free, condensed seasoning powder, comprising the steps of:
   (a) adding koji mold to proteinaceous and/or starch-rich starting materials to produce koji;
   (b) subjecting said koji to hydrolysis, without adding salt, in the presence of alcohol;
   (c) removing insolubles from the hydrolysate; and
   (d) concentrating and drying the remaining mother liquor to yield seasoning powder.

2. The process of claim 1, wherein said koji mold is *Aspergillus sojae* or *Aspergillus oryzae*.

3. The process of claim 1, wherein said proteinaceous materials are of animal, vegetable, or microorganismal origin.

4. The process of claim 3, wherein said proteinaceous materials are selected from the group consisting of soy bean, soy protein products, wheat gluten, corn gluten, or refined soy protein.

5. The process of claim 1, wherein said starch-rich materials are selected from the group consisting of rice, wheat, barley, wheat bran, and corn.

6. The process of claim 1, wherein said starting materials are subjected to a pretreatment selected from the group consisting of conventional pressure and heat puffing, heat treatment, and a combination thereof.

7. The process of claim 1, wherein the amount of water employed for hydrolysis in step (b) is in the range of from about 1 to about 2 times the weight of said koji.

8. The process of claim 1, wherein the amount of said alcohol in step (b) ranges from 3 to 50% by volume.

9. The process of claim 1, wherein the temperature is from about 30° C. to about 40° C.

10. The process of claim 1, wherein said hydrolysate is obtained within about 1 to about 5 days.

11. The process of claim 1, wherein said alcohol is ethanol.

12. The process of claim 1, wherein the taste of said seasoning powder is varied by varying the ratio of said starting proteinaceous material to said starch-rich starting material, and also by varying the types thereof.

13. A process for the manufacture of salt-free, condensed seasoning powder, comprising the steps of:
   (a) sprinkling 100 kg of soy protein products with 140 l of water to produce a soy protein products/water mixture;
   (b) pretreating said mixture with heat and pressure;
   (c) adding 100 kg of roasted and ground wheat grain to said mixture in step (b), and mixing thoroughly;
   (d) inoculating said mixture in step (c) with *Aspergillus sojae;*
   (e) holding said mixture at about 30° C. for two days to yield soy koji;
   (f) mixing said soy koji with 270 l of water and 20 l of 99.5% ethanol;
   (g) subjecting said mixture to hydrolysis at 38° C. for 72 hours, with occasional agitation, to produce an hydrolysate;
   (h) compressing said hydrolysate to yield mother liquor;
   (i) removing insolubles from said mother liquor;
   (j) concentrating said mother liquor to half the original volume under reduced pressure to produce a concentrate; and
   (k) drying and pulverizing said concentrate to produce seasoning powder.

14. The method of claim 13, wherein 200 l of water are employed in step (a).

15. The product produced by the process of claim 1.

16. The product produced by the process of claim 13.

17. The product produced by the process of claim 14.

* * * * *